United States Patent
Hung et al.

(10) Patent No.: US 12,542,093 B2
(45) Date of Patent: Feb. 3, 2026

(54) DISPLAY APPARATUS AND METHOD FOR COMPENSATING DISPLAY APPARATUS

(71) Applicant: Novatek Microelectronics Corp., Hsinchu (TW)

(72) Inventors: Wen-Lung Hung, Hsinchu (TW); Yu-Yi Chien, New Taipei (TW); Po-Yuan Hsieh, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/642,813

(22) Filed: Apr. 22, 2024

(65) Prior Publication Data

US 2025/0014507 A1 Jan. 9, 2025

Related U.S. Application Data

(60) Provisional application No. 63/525,369, filed on Jul. 7, 2023.

(30) Foreign Application Priority Data

Feb. 1, 2024 (TW) .................................. 113103891

(51) Int. Cl.
G09G 3/32 (2016.01)
G06T 7/00 (2017.01)
G09G 3/00 (2006.01)

(52) U.S. Cl.
CPC ............. *G09G 3/32* (2013.01); *G06T 7/0002* (2013.01); *G09G 3/006* (2013.01);
(Continued)

(58) Field of Classification Search
None
See application file for complete search history.

(56) References Cited

U.S. PATENT DOCUMENTS

| 10,354,981 B2 | 7/2019 | Lai et al. |
| 10,476,043 B2 | 11/2019 | Lai et al. |

(Continued)

FOREIGN PATENT DOCUMENTS

| CN | 109887468 | 6/2019 |
| CN | 112382237 | 2/2021 |

(Continued)

OTHER PUBLICATIONS

"Office Action of Taiwan Counterpart Application", issued on Feb. 18, 2025, p. 1-p. 5.

*Primary Examiner* — Andre L Matthews
(74) *Attorney, Agent, or Firm* — JCIPRNET

(57) ABSTRACT

A display apparatus includes a display screen and a driver circuit. The display screen includes a plurality of light boxes. Each of the light boxes includes a plurality of light panels. Each of the light panels includes a plurality of display pixels. The driver circuit is coupled to the display screen. The driver circuit is configured to drives the display screen to display an image. The driver circuit performs a first compensation operation on the display screen according to a first compensation data, and the first compensation data is calculated on the basis of the light panels. The driver circuit performs a second compensation operation on the display screen according to a second compensation data, and the second compensation data is calculated on the basis of the display pixels.

20 Claims, 4 Drawing Sheets

(52) U.S. Cl.
CPC ............ *G09G 2300/026* (2013.01); *G09G 2320/0233* (2013.01); *G09G 2320/0242* (2013.01)

(56) References Cited

U.S. PATENT DOCUMENTS

| | | | |
|---|---|---|---|
| 2005/0134525 A1* | 6/2005 | Tanghe | G06F 3/1446 345/1.1 |
| 2005/0134526 A1* | 6/2005 | Willem | G06F 3/147 345/1.3 |
| 2010/0053450 A1* | 3/2010 | Hanamura | G06F 3/1446 348/739 |
| 2012/0062621 A1* | 3/2012 | Miyahara | G09G 5/10 345/690 |
| 2016/0155389 A1* | 6/2016 | Beon | G09G 3/3406 345/690 |
| 2018/0159088 A1 | 6/2018 | Lai et al. | |
| 2019/0288245 A1 | 9/2019 | Lai et al. | |
| 2020/0193897 A1* | 6/2020 | Park | G09G 3/2003 |
| 2021/0174754 A1* | 6/2021 | Yang | G06N 99/00 |
| 2022/0398988 A1 | 12/2022 | Xiao | |

FOREIGN PATENT DOCUMENTS

| | | |
|---|---|---|
| CN | 115241222 | 10/2022 |
| TW | 201443867 | 11/2014 |
| TW | 201822589 | 6/2018 |

\* cited by examiner

DISPLAY APPARATUS AND METHOD FOR COMPENSATING DISPLAY APPARATUS

CROSS-REFERENCE TO RELATED APPLICATION

This application claims the priority benefit of U.S. provisional application Ser. No. 63/525,369, filed on Jul. 7, 2023, and Taiwan application serial no. 113103891, filed on Feb. 1, 2024. The entirety of each of the above-mentioned patent applications is hereby incorporated by reference herein and made a part of this specification.

BACKGROUND

Technical Field

The disclosure relates to a display apparatus and a method for compensating the display apparatus; more particularly, the disclosure relates to a display apparatus including a light emitting device and a method for compensating the display apparatus.

Description of Related Art

In addition to a surface mount device (SMD) packaging process, methods for packaging light emitting diode (LED) display panels on the market also include a chip on board (COB) packaging process. The COB packaging process offers advantages such as superior protection and ultra-high contrast; however, due to an encapsulant used for packaging, there may be issues with inconsistent ink colors. If only the current brightness and chromaticity compensation methods are employed, color blocks may persist, leading to unsatisfactory compensation effects.

SUMMARY

The disclosure provides a display apparatus and a method for compensating the display apparatus, which may enhance brightness uniformity and chromaticity uniformity of a display screen.

According to an embodiment of the disclosure, a display apparatus includes a display screen and a driver circuit. The display screen includes a plurality of light boxes. Each of the light boxes includes a plurality of light panels. Each of the light panels includes a plurality of display pixels. The driver circuit is coupled to the display screen and configured to drive the display screen to display an image. The driver circuit performs a first compensation operation on the display screen according to a first compensation data, and the first compensation data is calculated on the basis of the light panels. The driver circuit performs a second compensation operation on the display screen according to a second compensation data, and the second compensation data is calculated on the basis of the display pixels.

According to an embodiment of the disclosure, a display apparatus includes a display screen. The display screen includes a plurality of light boxes. Each of the light boxes includes a plurality of light panels. Each of the light panels includes a plurality of display pixels. A method for compensating the display apparatus includes: performing a first compensation operation on the display screen according to a first compensation data, where the first compensation data is calculated on the basis of the light panels; performing a second compensation operation on the display screen according to a second compensation data, where the second compensation data is calculated on the basis of the display pixels.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF THE EMBODIMENTS

The following embodiments are presented to provide a detailed explanation of the disclosure, but the embodiments provided in the disclosure should not be construed as limitations and can be appropriately combined. The terminology "coupling/coupled" or "connecting/connected" used throughout the whole description of the disclosure (including the claims) may refer to any direct or indirect connection means. For instance, if the disclosure describes that a first device is coupled (or connected) to a second device, it should be interpreted that the first device may be directly connected to the second device, or that the first device may be indirectly connected to the second device through other devices or certain connection means. Besides, the terminology "signal" may refer to a current, a voltage, an electric charge, a temperature, data, an electromagnetic wave, or any one or a combination of signals.

Figure 1:
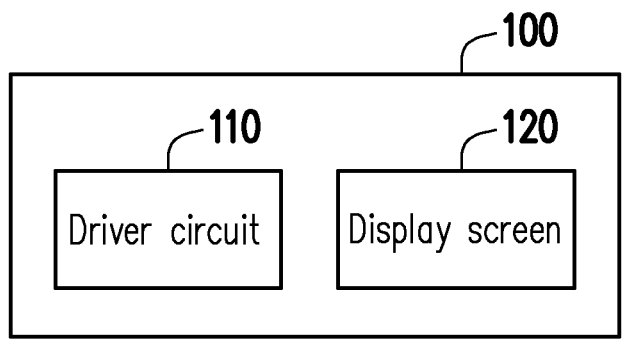
FIG. 1 is a schematic block view illustrating a display apparatus according to an embodiment of the disclosure.
Figure 2:
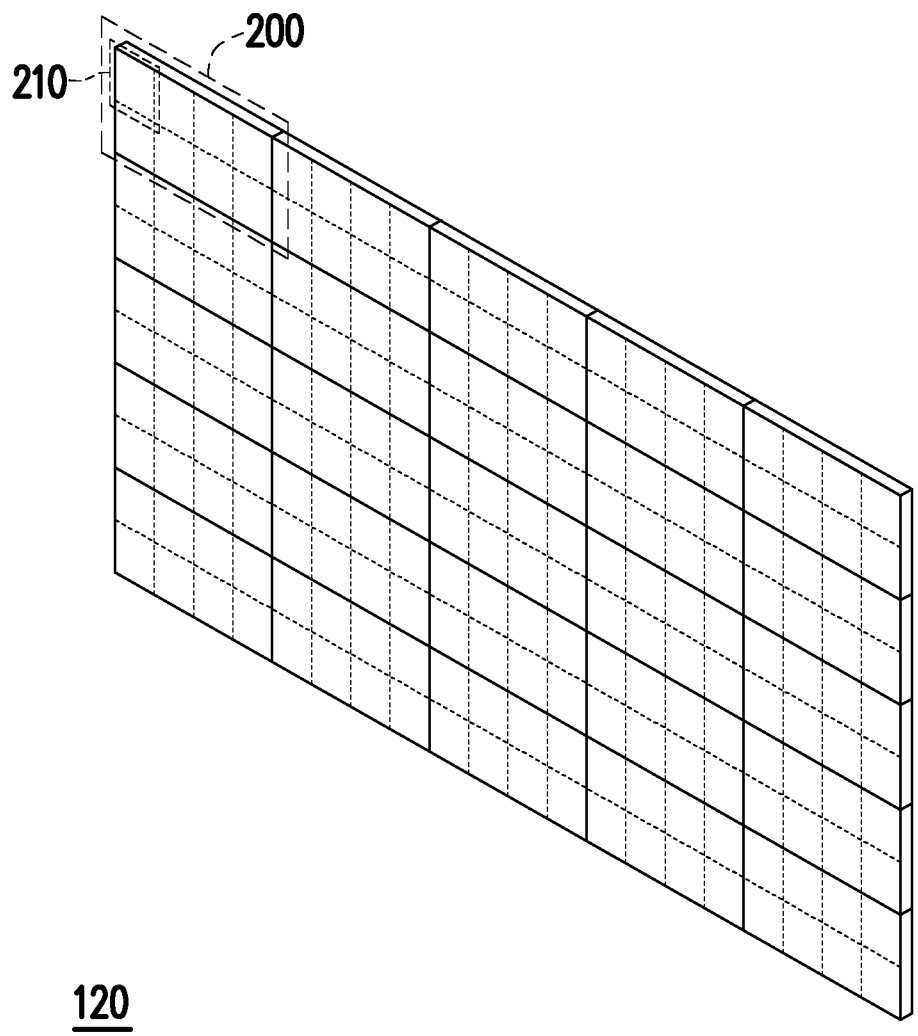
FIG. 2 is a schematic side view illustrating the display screen provided in the embodiment depicted in FIG. 1.

FIG. 1 is a schematic block view illustrating a display apparatus according to an embodiment of the disclosure. FIG. 2 is a schematic side view illustrating the display screen provided in the embodiment depicted in FIG. 1. With reference to FIG. 1 and FIG. 2, a display apparatus 100 includes a driver circuit 110 and a display screen 120. The driver circuit 110 is configured to drive the display screen 120 to display an image. The display screen 120 includes a plurality of light boxes 200. Each light box 200 includes a plurality of light panels 210. Each light panel 210 includes a plurality of display pixels. The driver circuit 110 is coupled to the display screen 120.

Specifically, the display screen 120 is, for instance, a large LED display screen made through performing an SMD packaging process or a COB packaging process, and is composed of the light boxes 200 arranged in an array. How the display screen 120 is packaged should not be construed as a limitation in the disclosure. Each light box 200 may be divided into a plurality of light panels (hereinafter referred to as LED light panels) 210, and each LED light panel 210 includes an LED array. Each display pixel (hereinafter referred to as an LED pixel) may include an LED device.

In this embodiment, the driver circuit 110, for instance, includes a plurality of display driver chips. Each LED light panel 210 may be equipped with one or more display driver chips, and the one or more display driver chips are configured to drive the corresponding LED light panel to display the corresponding image. For instance, in one LED light panel 210, the display driver chip may generate a driving signal based on a corresponding image data to drive the LED pixels therein, and the same LED light panel 210 may be set to have the same signal gain value. The display driver chip generates the driving signal based on the signal gain value to drive the LED pixels in the LED light panel. For instance, the signal configured to drive the LED pixels is, for instance, a current, and therefore the signal gain value may be a current gain value.

In this embodiment, the overall display screen 120 may be composed of the light boxes 200, and each light box is composed of spliced LED light panels 210. The display image of each LED light panel 210 may exhibit slight variations. If such differences are not calibrated, a boundary may appear on the display image of the same light box, leading to an uneven display image. In addition, if the overall display image on the display screen 120 exhibits unevenness, such unevenness may result from variations in brightness or chromaticity between the light boxes on the display screen, variations in brightness or chromaticity between the LED light panels within the light box, or variations in brightness or chromaticity among the LED pixels on the LED light panel.

Therefore, in order to improve the display quality of the display screen 120, in an embodiment of the disclosure, the signal gain value or image data of the LED light panels 210 may be compensated first to enhance the overall brightness uniformity or chromaticity uniformity of the display screen 120, as explained below.

Figure 3:
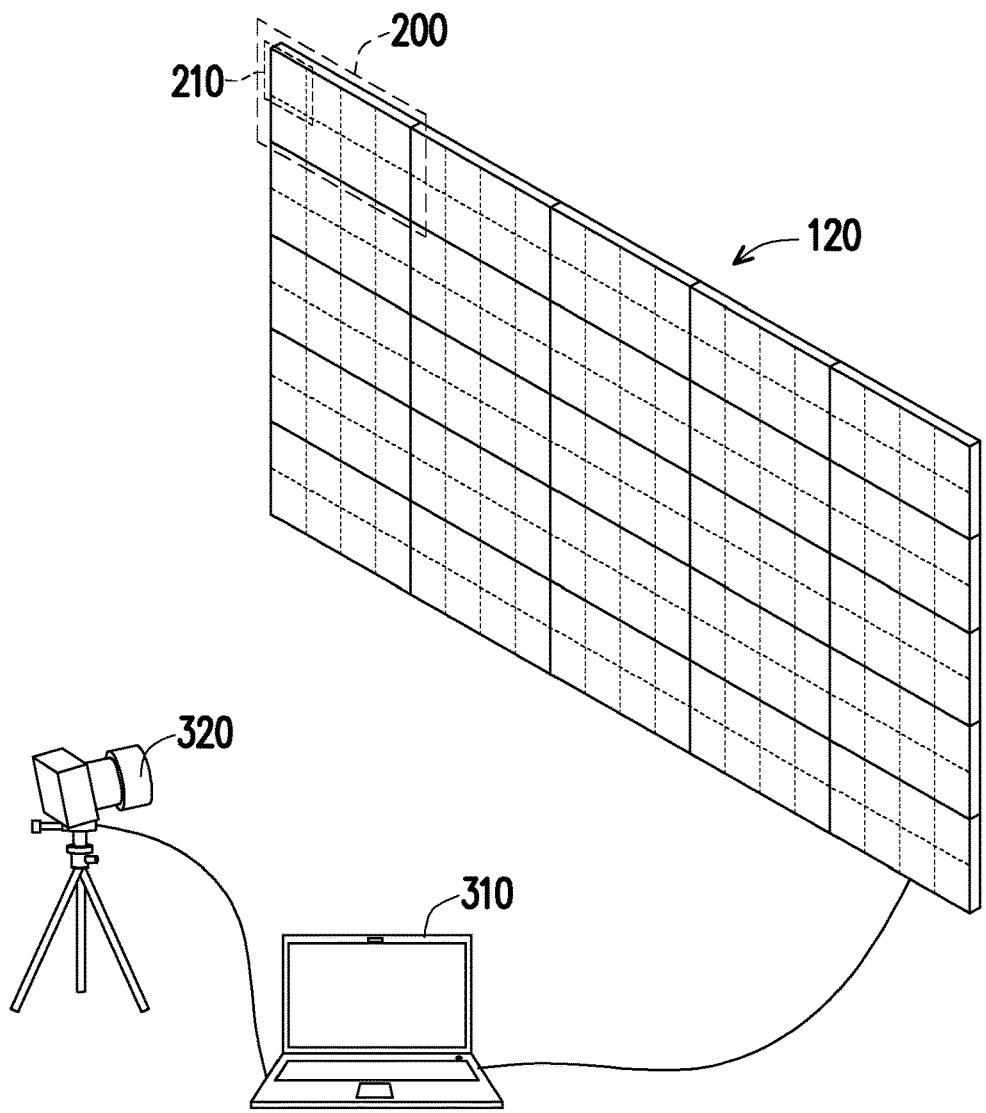
FIG. 3 is a schematic view illustrating a calibration scenario according to an embodiment of the disclosure.
Figure 4:
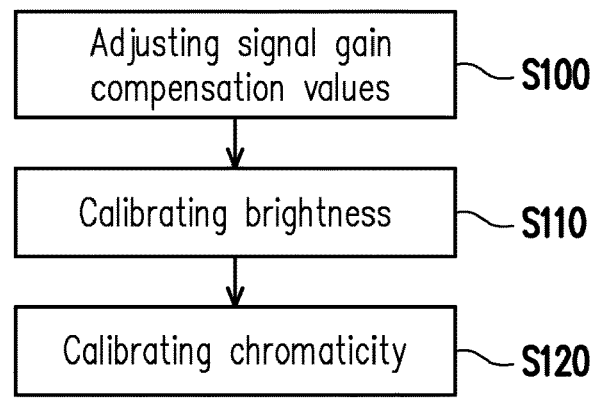
FIG. 4 is a flowchart of a method for compensating the display apparatus provided in the embodiment depicted in FIG. 3.

FIG. 3 is a schematic view illustrating a calibration scenario according to an embodiment of the disclosure. FIG. 4 is a flowchart of a method for compensating the display apparatus provided in the embodiment depicted in FIG. 3. With reference to FIG. 1, FIG. 3, and FIG. 4, in step S100, the host system 310 obtains light panel information of each LED light panel 210 by a colorimeter or a camera (an image capturing apparatus) 320, where the light panel information includes, for instance, a brightness value or a chromaticity value of each LED light panel 210. Accordingly, the overall brightness uniformity or chromaticity uniformity of the display screen 120 may be learned. Then, the host system 310 calculates signal gain compensation values (a first compensation data) on the basis of the obtained light panel information. The signal gain compensation values may be stored in a storage circuit of the driver circuit 110 or the host system 310, which should however not be construed as a limitation in the disclosure. "On the basis of the light panel" means that the host system 310 calculates the corresponding signal gain compensation values for each LED light panel 210 using the light panel as a unit.

Therefore, the signal gain value of each LED light panel 210 may be adjusted according to the signal gain compensation values. When each LED light panel 210 is driven, the driver circuit 110 may generate the driving signal (a first compensation operation) based on the adjusted signal gain value to drive each LED light panel 210. By adjusting the signal gain value of each LED light panel 210, the brightness difference or the chromaticity difference between each light panel may be reduced.

In this embodiment, the host system 310, for instance, calculates different signal gain compensation values for each LED light panel 210 when the LED light panel 210 displays red, green, and blue colors. For instance, before compensation, the signal gain values of the LED light panel 210 are (Gr, Gg, Gb), which are configured to generate signals (such as currents) for driving the LED light panel 210 to display the red, green, and blue colors, where Gr, Gg, and Gb are positive values. The host system 310 may calculate signal gain compensation values (dGr, dGg, dGb) corresponding to red, green, and blue colors in step S100, where dGr, dGg, and dGb may be positive or negative values. If the LED light panel 210 is excessively bright, the signal gain compensation values may be negative; if the LED light panel 210 is excessively dark, the signal gain compensation values may be positive. Therefore, the adjusted signal gain values are (Gr+dGr, Gg+dGg, Gb+dGg). The driver circuit 110 may generate signals for driving the LED light panel 210 to display red, green, and blue colors based on the adjusted signal gain values (Gr+dGr, Gg+dGg, Gb+dGg).

In this embodiment, the signal gain values of each LED light panel 210 before and after adjustment may be the same or different, which should however not be construed as a limitation in the disclosure.

Next, in step S110, the host system 310 obtains the brightness information of each LED pixel by a camera 320. The host system 310 usually obtains the brightness information of a plurality of gray scales. Next, the host system 310 calculates brightness compensation values (a second compensation data) according to the brightness information of each gray scale on the basis of the pixels. The other brightness compensation values that are not calculated in the same manner because the brightness information of each gray scale is not obtained may be calculated by interpolation. The method for calculating the brightness compensation values may be any calculation method well known in the pertinent technical field. The brightness compensation values are configured to compensate the brightness data in the image data; therefore, driving the LED pixels with the compensated brightness data may make the overall brightness of the display screen 120 more uniform. The brightness compensation values may be stored in the storage circuit of the driver circuit 110 or the host system 310, which should however not be construed as a limitation in the disclosure. "Calculated on the basis of the pixels" means that the host system 310 calculates the corresponding brightness compensation values for each LED pixel on the basis of the pixel as a unit.

Therefore, when driving each LED pixel, the driver circuit 110 may adjust the brightness data of each LED pixel according to the brightness compensation values and drive each LED pixel according to the adjusted brightness data (the second compensation operation). As such, by adjusting the brightness data of each LED pixel, the overall brightness of the display screen 120 may be made more uniform.

Next, in step S120, the host system 310 obtains the chromaticity information of each LED pixel by the camera 320. Then, the host system 310 calculates chromaticity compensation values (a third compensation data) according to chromaticity information on the basis of pixels, and a method of calculating the chromaticity compensation values includes, for instance, using matrix calculations for color space conversion. The method for calculating the chromaticity compensation values may be any calculation method well known in the pertinent technical field. The chromaticity compensation values are configured to compensate the chromaticity data in the image data; therefore, driving the LED pixels with the compensated chromaticity data may make the overall chromaticity of the display screen 120 more uniform. The chromaticity compensation values may be stored in the storage circuit of the driver circuit 110 or the host system 310, which should however not be construed as a limitation in the disclosure. "On the basis of the pixels" means that the host system 310 calculates the corresponding chromaticity compensation values for each LED pixel in the unit of a pixel.

Therefore, when driving each LED pixel, the driver circuit 110 may adjust the chromaticity data of each LED pixel according to the chromaticity compensation values and drive each LED pixel on the basis of the adjusted chromaticity data (the third compensation operation). As such, by adjusting the chromaticity data of each LED pixel, the overall chromaticity of the display screen 120 may be made more uniform.

In this embodiment, the host system 310 initially adjusts the signal gain value of each LED light panel to minimize the brightness or chromaticity differences between the light panels. Consequently, during subsequent brightness calibration and chromaticity calibration processes, the display image on the display screen 120 becomes smoother, reducing the likelihood of observable brightness or chromaticity differences between the light boxes or the light panels in the final calibration result.

Besides, in this embodiment, the host system 310 initially performs the brightness calibration process (step S110), so that the subsequent chromaticity calibration process (step S120) allows calculations within a linear range, which may make the chromaticity compensation values configured for calibrations closer to the ideal value. However, this should not be construed as a limitation in the disclosure. In an embodiment, the chromaticity calibration process may also be performed before the brightness calibration process. In an embodiment, one of the brightness calibration process or the chromaticity calibration process may be performed.

Figure 5:
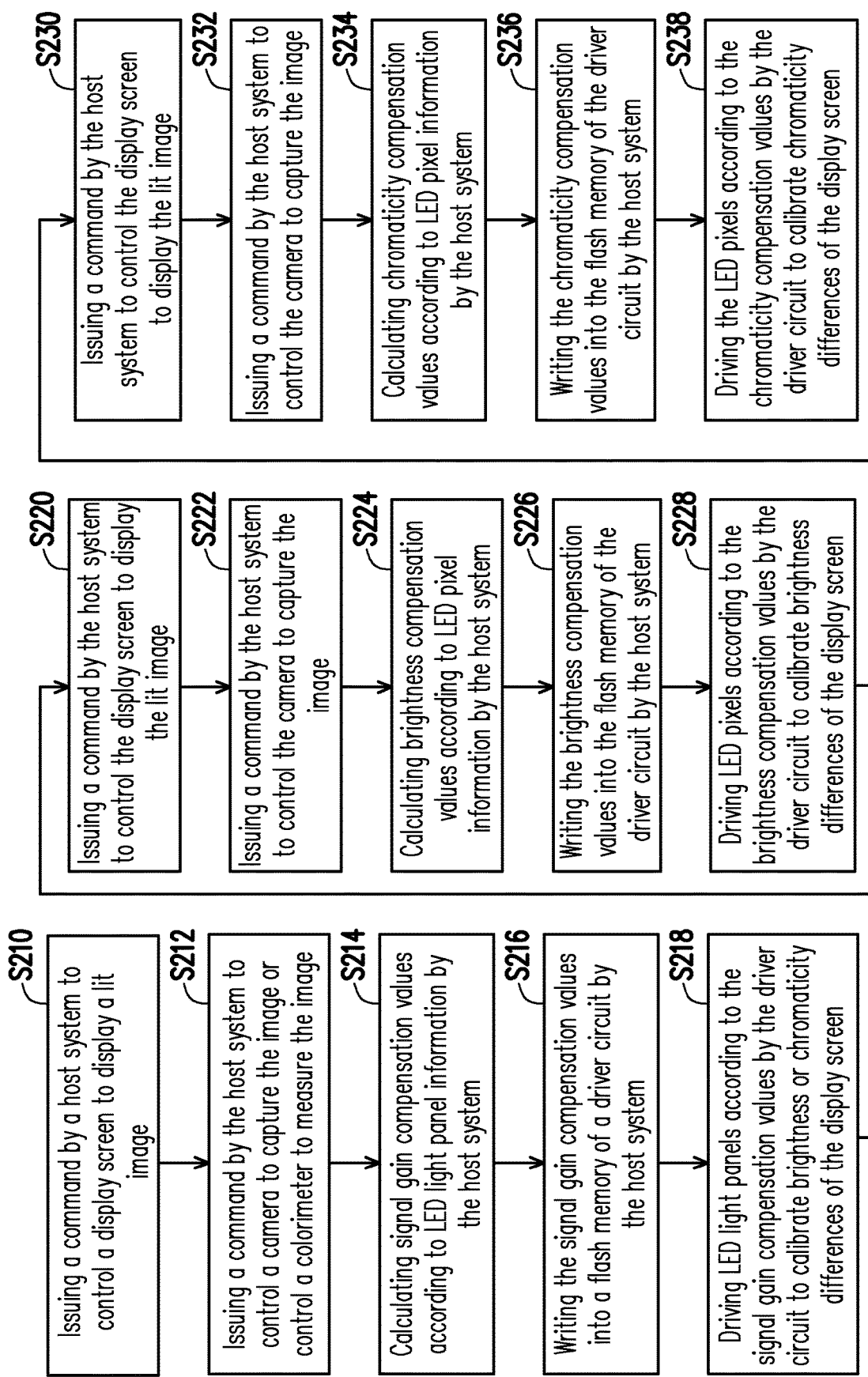
FIG. 5 is a flowchart of a method for compensating a display apparatus according to another embodiment of the disclosure.

FIG. 5 is a flowchart of a method for compensating a display apparatus according to another embodiment of the disclosure. With reference to FIG. 1, FIG. 3, and FIG. 5, in step S210, the host system 310 issues a command to control the display screen 120 to display a lit image. In step S210, a method of displaying the lit image is, for instance, performed by the host system 310 providing a front-end image or using a built-in image in the driver circuit 110 to drive the display screen 120 to display the lit image. In step S212, the host system 310 issues a command to control the camera 320 to capture the image or control a colorimeter to measure the image. In step S214, the host system 310 calculates the signal gain compensation values according to LED light panel information. In step S216, the host system 310 writes the signal gain compensation values into a flash memory of the driver circuit 110. In step S218, the driver circuit 110 drives the LED light panels according to the signal gain compensation values to calibrate brightness or chromaticity differences of the display screen 120. Step S218 may be executed by a data driver in the driver circuit 110, which should however not be construed as a limitation in the disclosure.

Next, in step S220, the host system 310 issues a command to control the display screen 120 to display the lit image. In step S222, the host system 310 issues a command to control the camera 320 to capture the image. In step S224, the host system 310 calculates the brightness compensation values according to the LED pixel information. In step S226, the host system 310 writes the brightness compensation values into the flash memory of the driver circuit 110. In step S228, the driver circuit 110 drives the LED pixels according to the brightness compensation values to calibrate the brightness differences of the display screen 120. Step S228 may be executed by a timing controller inside or outside the driver circuit 110, which should however not be construed as a limitation in the disclosure. The driver circuit 110 provided in one or more embodiments of the disclosure may or may not include the timing controller.

Subsequently, in step S230, the host system 310 issues a command to control the display screen 120 to display the lit image. In step S232, the host system 310 issues a command to control the camera 320 to capture the image. In step S234, the host system 310 calculates the chromaticity compensation values according to the LED pixel information. In step S236, the host system 310 writes the chromaticity compensation values into the flash memory of the driver circuit 110. In step S238, the driver circuit 110 drives the LED pixels according to the chromaticity compensation values to calibrate the chromaticity differences of the display screen 120. Step S238 may be executed by the timing controller inside the driver circuit 110, which should however not be construed as a limitation in the disclosure.

The method for compensating the display apparatus in the embodiment depicted in FIG. 5 can be sufficiently understood from the teachings, suggestions, and implementation explanations provided in FIG. 1 to FIG. 4 and thus will not be further elaborated upon.

Figure 6:
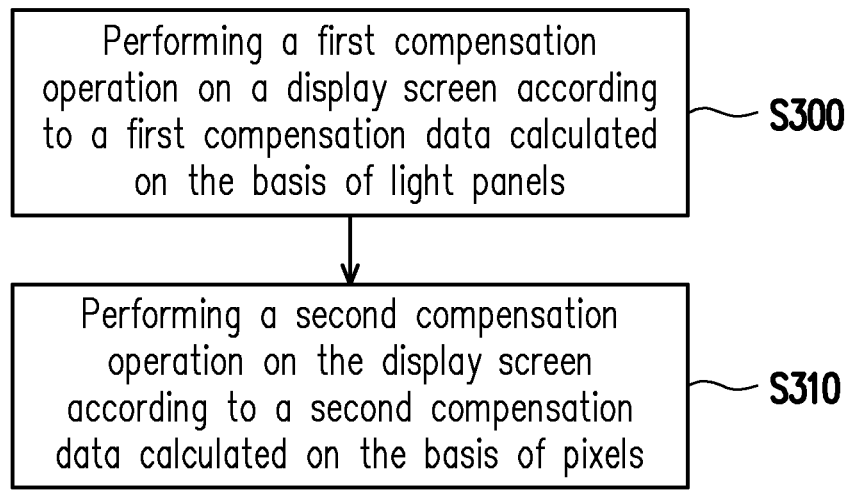
FIG. 6 is a flowchart of a method for compensating a display apparatus according to another embodiment of the disclosure.

FIG. 6 is a flowchart of a method for compensating a display apparatus according to another embodiment of the disclosure. With reference to FIG. 1, FIG. 3, and FIG. 6, in step S300, the driver circuit 110 performs a first compensation operation on the display screen 120 according to a first compensation data calculated on the basis of the light panels. In this embodiment, a method for compensating the display apparatus may further include capturing a first image displayed on the display screen 120 through the image capturing apparatus 320, and the host system 310 calculates the first compensation data on the basis of the light panels according to the first image.

In step S310, the driver circuit 110 performs a second compensation operation on the display screen 120 according to a second compensation data calculated on the basis of the pixels. In this embodiment, a method for compensating the display apparatus may further include capturing a second image displayed on the display screen 120 through the image capturing apparatus 320, and the host system 310 calculates the second compensation data on the basis of the pixels according to the second image. In this embodiment, the second compensation operation is performed after the first compensation operation.

In an embodiment, the method for compensating the display apparatus may further include capturing a third image displayed on the display screen 120 through the image capturing apparatus 320, and the host system 310 calculates the third compensation data on the basis of the pixels according to the third image. The driver circuit 110 performs a third compensation operation on the display screen 120 according to the third compensation data calculated on the basis of the pixel. The third compensation operation is performed after the second compensation operation. Here, the second compensation operation may be either a brightness compensation operation or a chromaticity compensation operation, and the third compensation operation may be the other one of the brightness compensation operation and the chromaticity compensation operation.

The method for compensating the display apparatus in the embodiment depicted in FIG. 6 can be sufficiently understood from the teachings, suggestions, and implementation explanations provided in FIG. 1 to FIG. 5 and thus will not be further elaborated upon.

Figure 7:
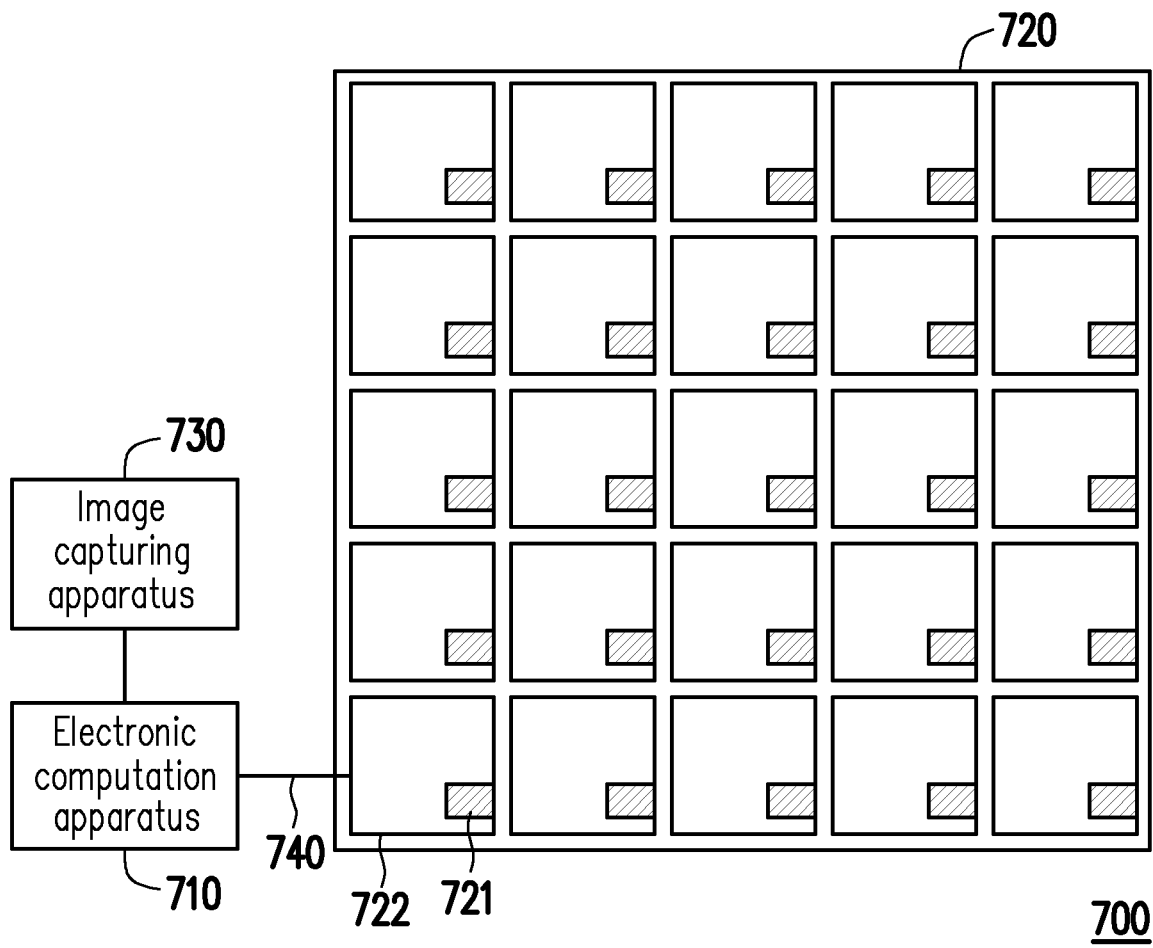
FIG. 7 is a flowchart of a calibration system including a display apparatus according to an embodiment of the disclosure.

FIG. 7 is a flowchart of a calibration system including a display apparatus according to an embodiment of the disclosure. With reference to FIG. 7, a calibration system 700 includes an electronic computation apparatus 710, a display screen 720, and an image capturing apparatus 730. The display screen 720 includes a plurality of light boxes 722, and each light box 722 includes a storage device 721.

The electronic computation apparatus 710 is, for instance, an electronic device with computation capabilities such as a computer. The image capturing apparatus 730 may be a camera, a colorimeter, or the like, which may be configured to capture images displayed on the display screen 720. The storage device 721 is, for instance, a flash memory that allows multiple read and write operations.

The electronic computation apparatus 710 may control the image capturing apparatus 730 to capture the images on the display screen 720, where the images on the display screen 720 may be composed of one single or multiple photographs. The electronic computation apparatus 710 receives the images on the display screen 720 captured by the image capturing apparatus 730 and composes these images into images corresponding to what is shown on the display screen 720.

The electronic computation apparatus 710 may calibrate the displayed image on the display screen 720 according to an image calibration program stored internally. The electronic computation apparatus 710 may execute the image calibration program to calculate a first compensation value. The first compensation value may ensure the uniformity of the display of each light box 722 on the display screen 720. After recording the first compensation value of each light box 722, the electronic computation apparatus 710 calculates a second compensation value. The second compensation value may ensure the uniformity of the display of the display pixels on one single light panel. Display uniformity includes image parameters, such as brightness, chromaticity, color temperature, and so on.

Next, the electronic computation apparatus 710 may write the compensation data for each light box 722 into the storage device 721 via a signal line (such as a network cable) 740. In an embodiment, the electronic computation apparatus 710 may also write the compensation data for each light box 722 into the storage device 721 in a wireless manner. The writing method includes but is not limited to a step of separately writing the first and second compensation values into the storage device 721, or a step of writing the first and second compensation values into the storage device 721 after mixing the first and second compensation values (e.g., through weighted calculations).

In an embodiment, a light panel may be removed and placed in another light box, but the compensation for the display pixels on this light panel may be constant or valid for a period. Therefore, when the light panel is installed in a new light box, the electronic computation apparatus 710 may omit the calculation of the second compensation value. In other words, the electronic computation apparatus 710 may first request each light panel to return its second compensation value, and if any light panel fails to return the second compensation value, the electronic computation apparatus 710 then calculates the second compensation value for that light panel.

The method for compensating the display apparatus in the embodiment depicted in FIG. 7 can be sufficiently understood from the teachings, suggestions, and implementation explanations provided in FIG. 1 to FIG. 6 and thus will not be further elaborated upon.

To sum up, in one or more embodiments of the disclosure, the host system first adjusts the signal gain values of each light panel to reduce the brightness difference or the chromaticity difference between the light panels. Then, when the brightness calibration and chromaticity calibration processes are performed, the display screen presents a relatively smooth image, reducing the likelihood of the brightness difference or the chromaticity difference between the light boxes or the light panels. Therefore, the method for compensating the display apparatus in one or more disclosed embodiments may be applied to enhance the brightness uniformity and the chromaticity uniformity of the display screen."

Although the disclosure has been described above through embodiments, the embodiments do not serve to pose any limitation in the disclosure. Those with ordinary knowledge in the pertinent technical field are able to make some modifications to the disclosed embodiments without departing from the spirit and scope of the disclosure, and therefore the protection scope provided in the disclosure shall be determined by the following claims and their equivalents.

What is claimed is:

1. A display apparatus, comprising:
   a display screen, comprising a plurality of light boxes, wherein each of the light boxes comprises a plurality of light panels, and each of the light panels comprises a plurality of display pixels; and
   a driver circuit, coupled to the display screen and configured to drive the display screen to display an image, wherein the driver circuit performs a first compensation operation on the display screen according to a first compensation data, the first compensation data is calculated on the basis of the light panels, the driver circuit performs a second compensation operation on the display screen according to a second compensation data, and the second compensation data is calculated on the basis of the display pixels when the second compensation data is not received from the light panels,
   wherein the second compensation operation is performed after the first compensation operation.

2. The display apparatus according to claim 1, wherein the first compensation data comprises a signal gain compensation value.

3. The display apparatus according to claim 1, wherein an image capturing apparatus captures a first image displayed by the display screen, and a host system calculates the first compensation data on the basis of the light panels according to the first image.

4. The display apparatus according to claim 1, wherein the second compensation data comprises one of a brightness compensation value and a chromaticity compensation value.

5. The display apparatus according to claim 4, wherein the driver circuit performs a third compensation operation on the display screen according to a third compensation data, and the third compensation data is calculated on the basis of the display pixels.

6. The display apparatus according to claim 5, wherein the third compensation data comprises the other one of the brightness compensation value and the chromaticity compensation value.

7. The display apparatus according to claim 5, wherein the third compensation operation is performed after the second compensation operation.

8. The display apparatus according to claim 5, wherein
the image capturing apparatus captures a second image displayed by the display screen, the host system calculates the second compensation data on the basis of the display pixels according to the second image,
the image capturing apparatus captures a third image displayed by the display screen, and the host system obtains the third compensation data on the basis of the display pixels according to the third image.

9. The display apparatus according to claim 1, wherein each of the display pixels comprises a light emitting diode device.

10. A method for compensating a display apparatus, wherein the display apparatus comprises a display screen, the display screen comprises a plurality of light boxes, the light boxes comprise a plurality of light panels, each of the light panels comprises a plurality of display pixels, and the compensation method comprises:
performing a first compensation operation on the display screen according to a first compensation data, wherein the first compensation data is calculated on the basis of the light panels; and
performing a second compensation operation on the display screen according to a second compensation data, wherein the second compensation data is calculated on the basis of the display pixels when the second compensation data is not received from the light panels,
wherein the second compensation operation is performed after the first compensation operation.

11. The method for compensating the display apparatus according to claim 10, wherein the first compensation data comprises a signal gain compensation value.

12. The method for compensating the display apparatus according to claim 10, further comprising:
capturing a first image displayed by the display screen; and
calculating the first compensation data on the basis of the light panels according to the first image.

13. The method for compensating the display apparatus according to claim 10, wherein the second compensation data comprises one of a brightness compensation value and a chromaticity compensation value.

14. The method for compensating the display apparatus according to claim 13, further comprising:
performing a third compensation operation on the display screen according to a third compensation data, wherein the third compensation data is calculated on the basis of the display pixels.

15. The method for compensating the display apparatus according to claim 14, wherein the third compensation data comprises the other one of the brightness compensation value and the chromaticity compensation value.

16. The method for compensating the display apparatus according to claim 14, wherein the third compensation operation is performed after the second compensation operation.

17. The method for compensating the display apparatus according to claim 14, further comprising:
capturing a second image displayed by the display screen; and
calculating the second compensation data on the basis of the display pixels according to the second image.

18. The method for compensating the display apparatus according to claim 17, further comprising:
capturing a third image displayed by the display screen; and
calculating the third compensation data on the basis of the display pixels according to the third image.

19. A display apparatus, comprising:
a display screen, comprising a plurality of light boxes, wherein each of the light boxes comprises a plurality of light panels, and each of the light panels comprises a plurality of display pixels; and
a driver circuit, coupled to the display screen and configured to drive the display screen to display an image,
wherein the driver circuit performs a first compensation operation on the display screen according to a first compensation data, the first compensation data is calculated on the basis of the light panels, the driver circuit performs a second compensation operation on the display screen according to a second compensation data, and the second compensation data is calculated on the basis of the display pixels when the second compensation data is not received from the light panels,
wherein the first compensation data comprises a signal gain compensation value, the second compensation data comprises one of a brightness compensation value and a chromaticity compensation value, and the second compensation operation is performed after the first compensation operation.

20. A display apparatus, comprising:
a display screen, comprising a plurality of light boxes, wherein each of the light boxes comprises a plurality of light panels, and each of the light panels comprises a plurality of display pixels; and
a driver circuit, coupled to the display screen and configured to drive the display screen to display an image,
wherein the driver circuit performs a first compensation operation on the display screen according to a first compensation data, the first compensation data is calculated on the basis of the light panels, the driver circuit performs a second compensation operation on the display screen according to a second compensation data, and the second compensation data is calculated on the basis of the display pixels,
wherein the second compensation operation is performed after the first compensation operation, and when the light panel is installed in a new light box, the driver circuit omits the calculation of the second compensation operation.

* * * * *